(12) United States Patent
Gorenzweig et al.

(10) Patent No.: US 9,669,669 B2
(45) Date of Patent: Jun. 6, 2017

(54) TIRE MONITORING SYSTEM FOR A VEHICLE

(71) Applicants: Igor Gorenzweig, Wuppertal (DE); Stefan Moenig, Schwelm (DE); Yevgen Dementyev, Wuppertal (DE); Sven Arnoldo, Malsch (DE); Axel Dussinger, Bad Rappenau (DE); Benedikt Gamer, Bretten (DE)

(72) Inventors: Igor Gorenzweig, Wuppertal (DE); Stefan Moenig, Schwelm (DE); Yevgen Dementyev, Wuppertal (DE); Sven Arnoldo, Malsch (DE); Axel Dussinger, Bad Rappenau (DE); Benedikt Gamer, Bretten (DE)

(73) Assignee: Huf Huelsbeck & Fuerst GmbH & Co. KG, Velbert (DE)

( * ) Notice: Subject to any disclaimer, the term of this patent is extended or adjusted under 35 U.S.C. 154(b) by 24 days.

(21) Appl. No.: 14/865,970

(22) Filed: Sep. 25, 2015

(65) Prior Publication Data
US 2016/0096404 A1    Apr. 7, 2016

(30) Foreign Application Priority Data
Oct. 2, 2014   (DE) .................. 10 2014 114 366

(51) Int. Cl.
*B60C 23/04*   (2006.01)
(52) U.S. Cl.
CPC ................. *B60C 23/0494* (2013.01)
(58) Field of Classification Search
None
See application file for complete search history.

(56) References Cited

U.S. PATENT DOCUMENTS

| 8,490,480 B2 | 7/2013 | Tadele et al. |
| 8,813,773 B2 | 8/2014 | Palaoro et al. |
| (Continued) | | |

FOREIGN PATENT DOCUMENTS

| DE | 10 2004 048 244 A1 | 6/2005 |
| DE | 20 2009 007 703 U1 | 4/2010 |
| DE | 10 2010 050 365 A1 | 5/2012 |

OTHER PUBLICATIONS

European Search Report of Corresponding European Application No. EP 15 18 1125 dated Jan. 26, 2016.

*Primary Examiner* — Andre Allen
(74) *Attorney, Agent, or Firm* — Fay Sharpe LLP

(57) ABSTRACT

A structurally simple tire monitoring system for a vehicle, for establishing tire-specific parameters, includes a valve stem with an attachment section, a fastening element and a tire air pressure sensor with a housing that has a mounting region. When the fastening element is in a locking position, the attachment section and the mounting region are releasably connected to one another using the fastening element. This is achieved in that the mounting region of the fastening element is movably supported between the locking position and an unlocking position, in which the mounting region and the attachment section can be released from one another. An elastic latching element is provided, which allows a movement of the fastening element relative to the housing toward the unlocking position, counter to a pressure exerted by the latching element. The latching element presses the fastening element into the locking position.

16 Claims, 5 Drawing Sheets

(56) References Cited

U.S. PATENT DOCUMENTS

| | | | |
|---|---|---|---|
| 2005/0087007 A1 | 4/2005 | Uleski | |
| 2011/0248204 A1* | 10/2011 | Palaoro | B60C 23/0408 251/366 |
| 2012/0312389 A1 | 12/2012 | Kempf | |
| 2014/0283923 A1* | 9/2014 | Kempf | B60C 23/0494 137/227 |
| 2015/0136244 A1* | 5/2015 | Kempf | B60C 23/0494 137/227 |
| 2015/0273957 A1* | 10/2015 | Kempf | B60C 23/0494 73/146.8 |
| 2016/0167463 A1* | 6/2016 | Gout | B60C 23/0498 73/146.3 |
| 2016/0303929 A1* | 10/2016 | Deniau | B60C 23/0498 |

\* cited by examiner

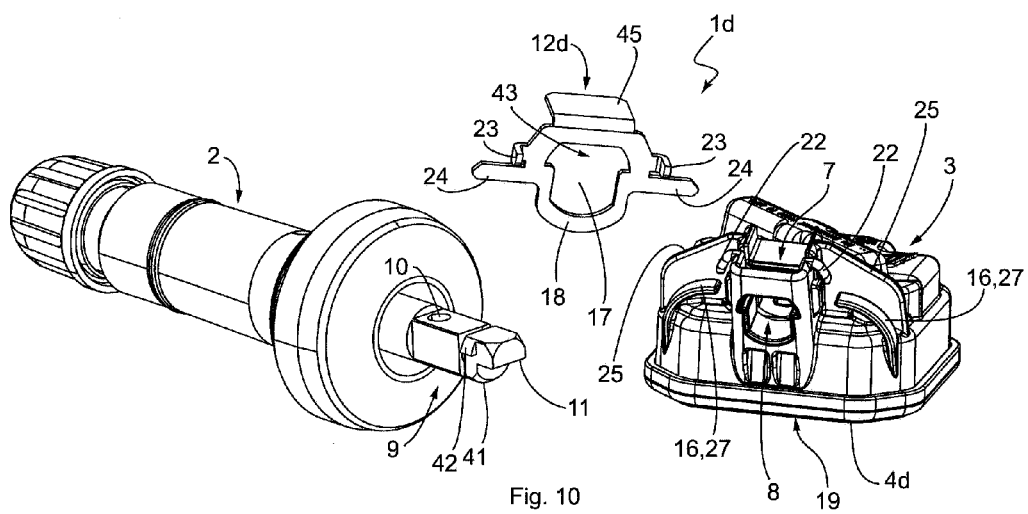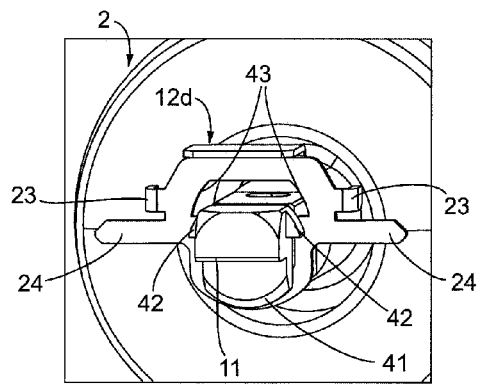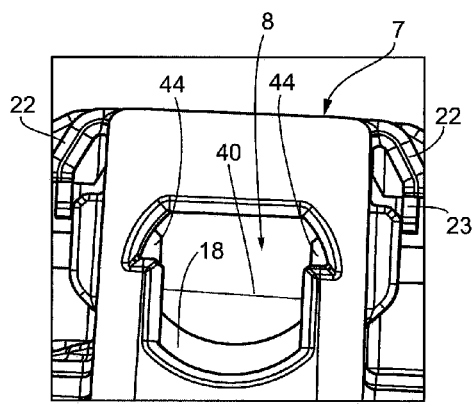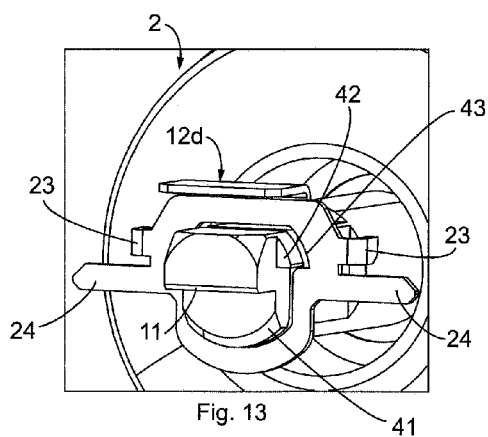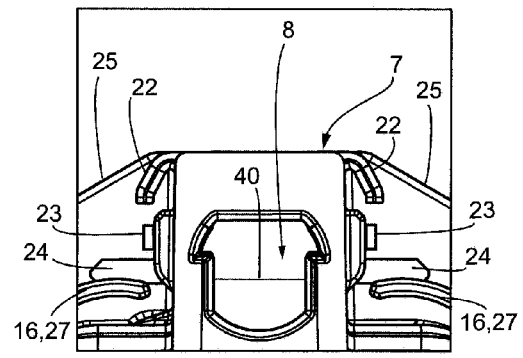

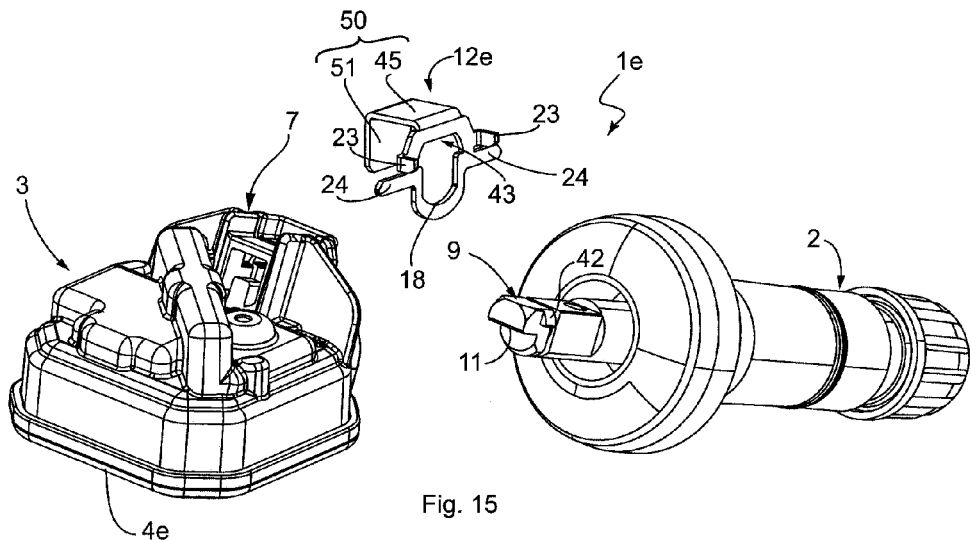
Fig. 15
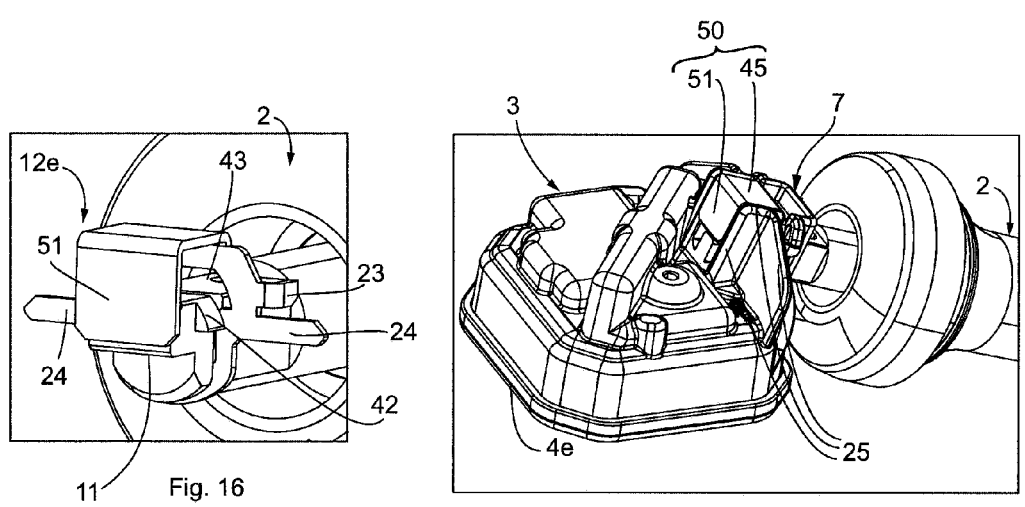
Fig. 16
Fig. 17
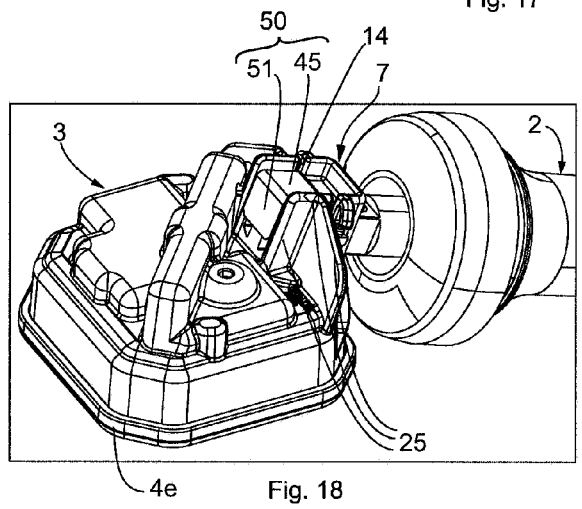
Fig. 18

TIRE MONITORING SYSTEM FOR A VEHICLE

BACKGROUND

The invention relates to a tire monitoring system for a vehicle for establishing tire-specific parameters, having a valve stem, at least one fastening element, and a tire pressure sensor with a housing in which means are accommodated for determining at least one tire-specific parameter and for the wireless transmission of the at least one tire-specific parameter, preferably to a vehicle control device, wherein the housing has a mounting region and the valve stem comprises an attachment section, and wherein the attachment section of the valve stem and the mounting region of the housing are releasably connected to one another with the aid of the fastening element when the at least one fastening element is in a locking position.

The vehicle safety and reliability are central aspects of automobile engineering. Therefore, simply for reasons of safety, the tire pressure on vehicles, or motor vehicles, should be checked regularly, which is something that is frequently neglected by vehicle drivers. For this reason, detection devices in the form of tire air pressure sensors are increasingly used in modern vehicles, which sensors automatically measure tire air pressure and transmit this to a vehicle-side control device. As a result, defects or accidents that can be attributed to insufficient tire air pressure can be avoided. Therefore, by means of this automatic measurement of the tire air pressure, a critical deviation of the measured tire air pressure from a tire pressure target value should be detected early and indicated to the vehicle driver, such that a manual checking is no longer necessary. With systems of this type, for the automatic measurement of the tire air pressure, a tire air pressure sensor is disposed on each wheel, or tire, respectively. A tire air pressure sensor frequently comprises at least one sensor for determining the tire air pressure or the temperature thereby, as well as a transmission unit and, optionally, an evaluation unit, which, however may also be provided in the vehicle.

With a tire monitoring system known from DE 10 2010 050 365 A1, the system comprises a valve stem, a tire air pressure sensor and a fastening element that secures the valve stem to the tire air pressure sensor, wherein the fastening element is in the form of a screw. In order to mount the valve stem on the tire air pressure sensor, the attachment section of the valve stem is inserted in a receiver formed on the housing of the tire air pressure sensor. The receiver has a bore hole, running transverse to the insertion direction of the valve stem, and into which the fastening element, designed as a screw, is screwed in order to attach the valve stem to the housing. The disadvantage with this known tire pressure control system is that there is a risk in the assembly process that the fastening element, designed as a screw, may become lost, and that an assembly aid in the form of screwdriver is necessary for establishing the screw connection, which in the end, holds the valve stem on the housing of the tire air pressure sensor.

A tire monitoring system of the type described in the introduction is known from DE 10 2004 048 244 A1 for example. This known tire monitoring system likewise has a valve stem, a tire air pressure sensor and a fastening element that secures the valve stem on the tire air pressure sensor. With this tire pressure control system, the fastening element is designed, however, as a spring clip, wherein the valve stem is inserted in a receiver formed on the housing for the tire air pressure sensor for attaching the valve stem to the tire air pressure sensor. The receiver has an insertion slot, running transverse to the insertion direction of the valve stem, and in which the fastening element, designed as a spring clip, is inserted, in order to engage in a recess formed in the peripheral surface of the attachment section of the valve stem, and as a result, to attach the valve stem to the housing. The fastening element assumes a locking position thereby. With this known tire monitoring system, there is the disadvantage that the fastening element is provided as a separate component, which may become lost, either during transportation or during the assembly/disassembly. In particular, there is the danger with this known tire monitoring system that the fastening element may loosen during operation, and abandon the locking position, such that the tire air pressure sensor can become detached from the valve stem and become damaged.

The fundamental object of the invention is to provide a solution, by which means a tire monitoring system is provided in a constructively simple manner, which is light, compact, inexpensive, and easy to install.

BRIEF SUMMARY

With a tire monitoring system of the type indicated in the introduction, the object is achieved according to the invention in that the mounting region of the housing movably supports the at least one fastening element between the locking position and an unlocking position, in which the mounting region and the attachment section can be separated from one another, and at least one elastic latching element is provided, which allows for a movement of the at least one fastening element in relation to the housing, toward the unlocking position, counter to a pressure exerted by the at least one elastic latching element, and which pushes the at least one fastening element into the locking position.

Advantageous and useful designs and further developments of the invention can be derived from the dependent Claims.

The invention makes a tire monitoring system for a vehicle available for establishing tire-specific parameters, which is distinguished by a structure that is functional, and has a simple and inexpensive construction. Because the housing movably supports the fastening element between the locking position and the unlocking position, it is possible to execute the installation and removal of the valve stem and tire air pressure sensor without tools, in that the fastening element is moved into the unlocking position. In order to move the fastening element from the locking position into the unlocking position, a technician must simply overcome a pressure exerted by the elastic latching element, and which pushes, or forces, the fastening element into the locking position. This overcoming of the pressure can occur through mere manipulation by hand, such that it is possible to install and remove the valve stem and tire air pressure sensor without tools.

In order to implement a predetermined and defined movement of the fastening element between the locking position and the unlocking position, one structurally convenient possibility is that a slot-shaped recess is formed in the chimney-shaped mounting region, which extends transverse to the longitudinal axis of the valve stem when the valve stem is installed, and in which the at least one fastening element is displaceably retained between the locking position and the unlocking position.

In order to securely attach the valve stem to the tire air pressure sensor, the invention provides, in its design of the tire monitoring system, that the at least one fastening element is substantially annular, or designed in the manner of a circle segment, and has a passage through which the attachment section can be inserted when the valve stem is mounted on the tire air pressure sensor, wherein, with the mounted valve stem, the at least one fastening element encompasses the attachment section of the valve stem, at least in sections, and a latching section of the substantially annular or circle-segment shaped fastening element, when in the locking position, is engaged, at least in sections, in the attachment section of the valve stem.

In order to facilitate the mounting of the valve stem on the tire air pressure sensor, the invention provides that, in a further design, the attachment section of the valve stem has a ramp-shaped bevel, formed on a section of the peripheral surface of the valve stem, wherein the ramp-shaped bevel forces the movably supported fastening element over the latching section, into the unlocking position, during the mounting of the valve stem. As a result, the fastening element does not need to be manipulated by the technician during the installation, because the ramp-shaped bevel pushes the latching section out of the movement path of the valve stem.

It is particularly convenient, with regard to a simple installation and secure attachment of the valve stem to the tire air pressure sensor, when, in the design of the invention, the attachment section of the valve stem has a latching recess, which is formed behind the ramp-shaped bevel on the attachment section, seen from the front surface of the attachment section, in the longitudinal direction of the valve stem, and in which the latching section of the fastening element engages when in the locking position. In this manner, the ramp-shaped bevel firstly provides for a simple installation, as has already been explained, wherein the latching section of the fastening element engages in the latching recess after sliding over the ramp-shaped bevel, such that the valve stem is attached to the tire air pressure sensor.

The latching recess and the latching section form a type of first closure, for attaching the valve stem to the tire air pressure sensor. In order to reinforce this attachment, the invention provides, in a further design of the invention, that at least one blocking lug protrudes from the attachment section of the valve stem, wherein the passage has an unlocking section adapted to the at least one blocking lug, which is disposed outside of the movement path of the valve stem when in the locking position, such that the at least one blocking lug bears on the fastening element, and blocks a movement of the valve stem away from tire air pressure sensor, and which is disposed in the movement path of the valve stem when in the unlocking position, such that the valve stem can be pulled out of the passage in order to remove it. The fastening element can be designed in the manner of a locking ring, or retaining ring, which can, however, move between the locking position and the unlocking position, wherein the locking ring engages in the attachment section of the valve stem when in the locking position, in order to secure the valve stem in its axial position, and in the unlocking position, the locking ring releases the valve stem in the axial direction of movement.

According to a first embodiment of the tire monitoring system according to the invention, it is provided that the at least one elastic latching element is designed as a spring element, which is inserted in a recess formed in the housing, and is supported on the base of the recess such that the at least one elastic latching element exerts pressure on the fastening element in a direction pointing away from the undersurface of the housing.

According to a second embodiment of the tire monitoring system according to the invention, it is provided that the at least one elastic latching element is designed as a spring arm formed as an integral part of the fastening element, wherein the spring arm bears against the housing such that the at least one elastic latching element exerts a pressure on the fastening element in a direction pointing away from the undersurface of the housing.

According to a third embodiment of the tire monitoring system according to the invention, it is provided that the at least one elastic latching element is designed as a spring arm formed as an integral part of the housing, wherein the spring arm is connected to the housing at its first longitudinal end, and its second longitudinal end presses against the at least one fastening element such that the at least one elastic latching element exerts pressure on the at least one fastening element, in a direction pointing away from the undersurface of the housing.

The expression "integral part" is to be understood with the present invention, for the second and third embodiments, as a synonym for the term "single-piece." "Integral part" does not necessarily mean thereby, as set forth in the invention, that the latching element must be manufactured together with the housing, that these components must be manufactured from a single and uniform part or substance, which, however, would also clearly be one meaning of "integral part" for the present invention. "Integral part" as set forth in the invention also means embodiments in which the latching element and the housing of the tire air pressure sensor are not merely permanently connected to one another, but also are connected to one another in such an integral manner that they no longer appear to be components that have been joined to one another, and can only be separated from one another when they are destroyed thereby.

For all three embodiments it is the case that the pressure of the at least one elastic latching element is directed away from the undersurface of the housing. The undersurface of the housing is placed on the rim for the vehicle tire, such that the pressure of the latching element acts in the same direction as the accelerating or centrifugal force. After mounting the tire monitoring system on vehicle tires, the acceleration or centrifugal force supports the attachment of the valve stem to the tire air pressure sensor, because it does not act against the pressure, but rather, it acts in the same direction as the pressure, or pressure of the latching element, respectively.

It is advantageous in the design of the third embodiment when at least one protective wall element extends parallel to the at least one latching element, which is formed on the housing, and the at least one elastic latching element extends in a direction pointing away from the housing. Damage to, or an unintentional actuation of, the latching element is thus impossible.

In order for the fastening element to be securely retained on the housing, and not slip out of the slot-shaped recess, as may happen with uninstalled valve stems, the design of the invention provides that the mounting region of the housing has at least one securing arm, which secures the at least one fastening element to the mounting region of the housing, in that the at least one securing arm blocks a movement of the at least one fastening element directed away from the unlocking position, beyond the locking position.

In this regard, in a special design the invention also provides that the at least one fastening element has a blocking arm, which bears against the securing arm of the housing when the at least one fastening element is in the locking position. The securing arm thus enables a movement of the fastening element from the unlocking position only as far as the locking position.

Lastly, in another design of the tire monitoring system, the invention provides that the attachment section of the valve stem has a flat area, at least in sections, and the mounting region of the housing has an insertion receiver designed to be complementary to the flat area, such that the attachment section of the valve stem can be inserted in the insertion receiver in a non-rotatable manner, in order to mount the valve stem on the tire air pressure sensor.

To simplify the installment, it is provided that the elastic latching element exerts a tensioning force on the fastening element, forcing the fastening element into the locking position. The fastening element is securely retained in its locking position by this tension, as long as the technician does not force the fastening element into the unlocking position for installation or removal purposes.

In another design, the invention provides that the fastening element has a hook shaped retaining attachment, formed at the top thereof, having at least one supporting section, which bears against the mounting region. The supporting section increases the stability for the mounting of the valve stem, and as a result, reduces the danger that the valve stem will be torn out of the housing for the tire air pressure sensor. Furthermore, the hook-shaped retaining attachment simplifies the production thereof on the whole, because it is not necessary to maintain narrow tolerances, because the positioning of the fastening element no longer needs to occur on the basis of the geometry of the slot-shaped recess, but rather, is defined by the bearing of the supporting section against the mounting region.

It is to be understood that the features specified above and to be explained below can be used not only in the given combinations, but also in other combinations or in and of themselves, without abandoning the scope of the present invention. The scope of the invention is only defined by the Claims.

BRIEF DESCRIPTION OF THE DRAWINGS

Further details, features and advantages of the subject matter of the invention can be derived from the following description in conjunction with the drawings, in which exemplary preferred embodiment examples of the invention are depicted. Therein:

FIG. 10 shows, in a perspective, exploded view, a tire monitoring system according to the invention, in accordance with a fourth embodiment, FIG. 11 shows an enlarged view of the front surface of a valve stem and a fastening element engaged therewith, in accordance with a fourth embodiment, FIG. 12 shows an enlarged view of a mounting region of a tire air pressure sensor and the fastening element in a locking position, in accordance with the fourth embodiment, FIG. 13 shows an enlarged view of the end surface of the valve stem and the fastening element no longer engaged therewith, in accordance with the fourth embodiment, FIG. 14 shows an enlarged view of the mounting region of the tire air pressure sensor and the fastening element in an unlocking position, in accordance with the fourth embodiment, FIG. 15 shows, in a perspective exploded view, a tire monitoring system according to the invention, in accordance with a fifth embodiment, FIG. 16 shows, in an enlarged depiction, a valve stem and a fastening element in accordance with the fifth embodiment shown in FIG. 15, FIG. 17 shows the tire monitoring system according to the fifth embodiment, with the fastening element in the locking position, and FIG. 18 shows the tire monitoring system according to the fifth embodiment, with the fastening element in the unlocking position.

DETAILED DESCRIPTION

Figure 5:
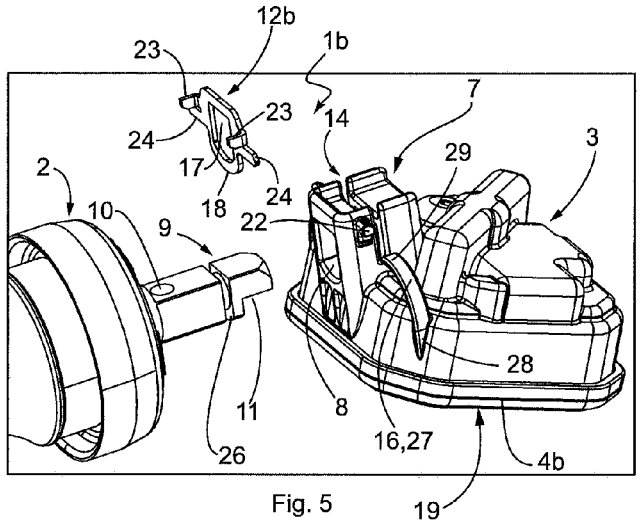
FIG. 5 shows a tire monitoring system according to the invention, in accordance with a second embodiment, in a perspective, exploded view.
Figure 6:
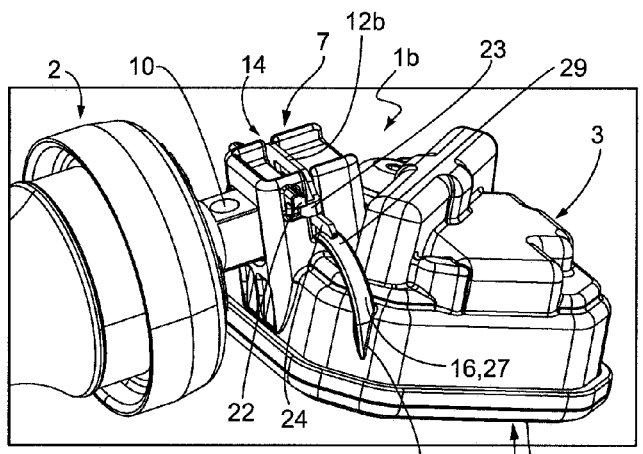
FIG. 6 shows the tire monitoring system according to the invention from FIG. 5, in a perspective view, with the valve stem installed.
Figure 7:
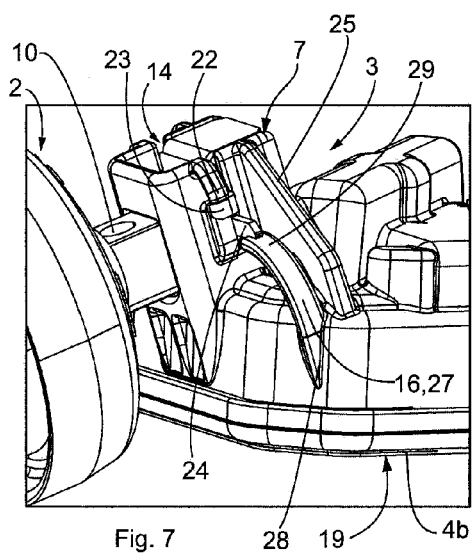
FIG. 7 shows an enlarged view of a mounting region of a tire air pressure sensor of the tire monitoring system from FIG. 5.
Figure 8:
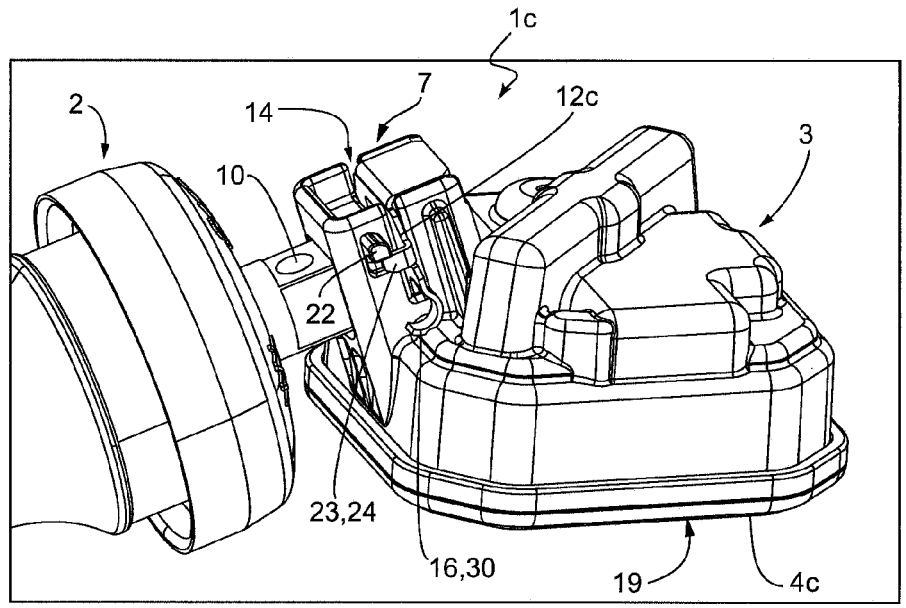
FIG. 8 shows an enlarged view of a tire monitoring system according to the invention, in accordance with a third embodiment.
Figure 9:
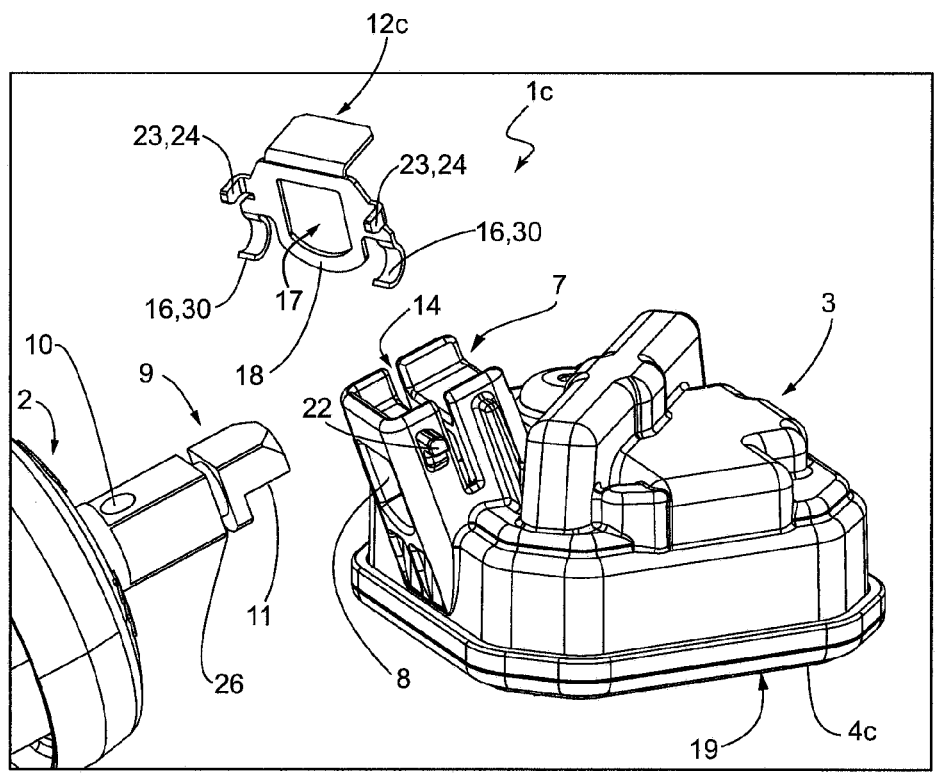
FIG. 9 shows an enlarged view of the tire monitoring system shown in FIG. 8, in an exploded view.

A tire monitoring system 1*a* according to a first embodiment of the invention is shown in FIGS. 1 to 4, while a tire monitoring system 1*b* according to a second embodiment of the invention is shown in FIGS. 5 to 7, a tire monitoring system 1*c* according to a third embodiment of the invention is shown in FIGS. 8 and 9, a tire monitoring system 1*d* according to a fourth embodiment of the invention is shown in FIGS. 10 to 14, and FIGS. 15 to 18 show a fifth embodiment of a tire monitoring system 1*e*. As long as the same reference symbols are used in the embodiments, they pertain to identical or similar elements or components in each case, such that the one description of the elements or components of one embodiment also applies for the other embodiments. The tire monitoring system 1*a*, 1*b*, 1*c*, 1*d* or 1*e*, respectively, can be implemented with a vehicle in the known manner, and is used to determine tire-specific parameters, such as air pressure or temperature. The determined parameters are then transmitted in the known manner to a vehicle-side control device, not shown in the Figures, wherein the parameters are evaluated and, if applicable, appropriate measures are taken.

The tire monitoring system 1*a* shown in FIGS. 1 to 4 comprises a valve stem 2 and a tire air pressure sensor 3. The tire air pressure sensor 3 has a housing 4*a*, in or on which means 5 for determining at least one tire-specific parameter, and for wireless transmission of the at least one tire-specific parameter to a vehicle-side control device, are accommodated. The means 5 are only shown in the enlarged depiction from FIG. 1, to the side thereof, in which the housing 4*a* is removed, shown in the form of a sensor 6 by way of example, wherein the tire air pressure sensors 3 of the second and third embodiments, i.e. the housings 4b and 4c, accommodate the aforementioned means, which are only shown in FIG. 1 by way of example for the other embodiments.

In reference to FIGS. 1 to 9, i.e. in reference to all three embodiments of the invention, the respective housing 4a, 4b, 4c has a mounting region 7, which protrudes in the manner of a chimney from the respective housings 4a, 4b, 4c, and is used to secure the valve stem 2. For this purpose, an insertion receiver 8 is formed on the corresponding mounting region 7 of the respective housing 4a, 4b, 4c, which serves to accommodate an attachment section 9 of the valve stem 2 that can be inserted into the insertion receiver 8. In order to align an opening 10 of the valve stem 2, by means of which air can be supplied to the vehicle tire, the attachment section 9 of the valve stem 2 has a flat area 11 (see FIG. 2, for example), wherein the insertion receiver 8 is designed such that it is complementary to the attachment section 9 having the flat area 11, such that, in order to mount the valve stem 2 on the housing 4a of the tire air pressure sensor 3, the attachment section 9 of the valve stem 2 can be inserted, and is inserted, in the insertion receiver 8 such that it cannot rotate.

Figure 1:
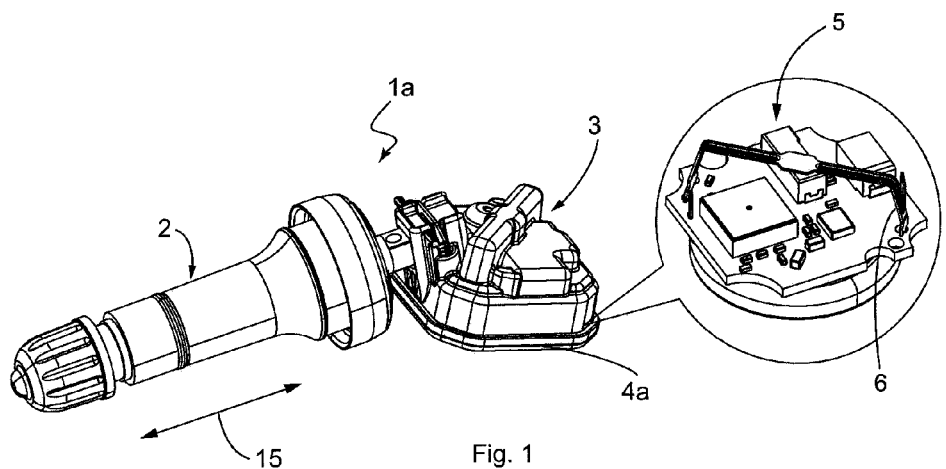
FIG. 1 shows, in a perspective view, a tire monitoring system according to the invention, in accordance with a first embodiment.
Figure 2:
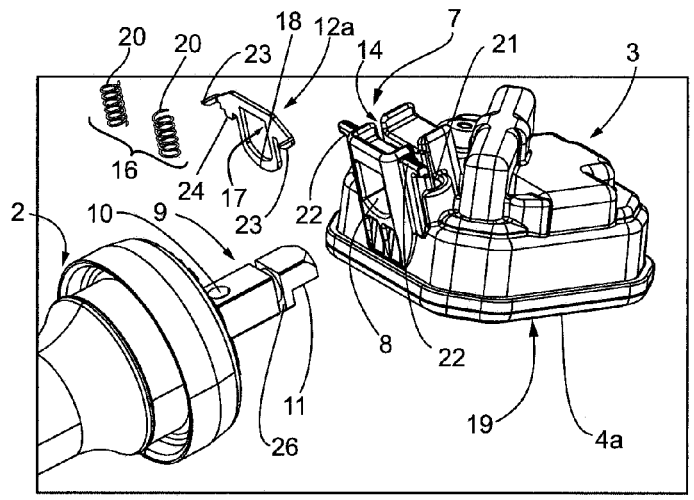
FIG. 2 shows the tire monitoring system according to the invention from FIG. 1 in a perspective, exploded view.
Figures 3, 4:
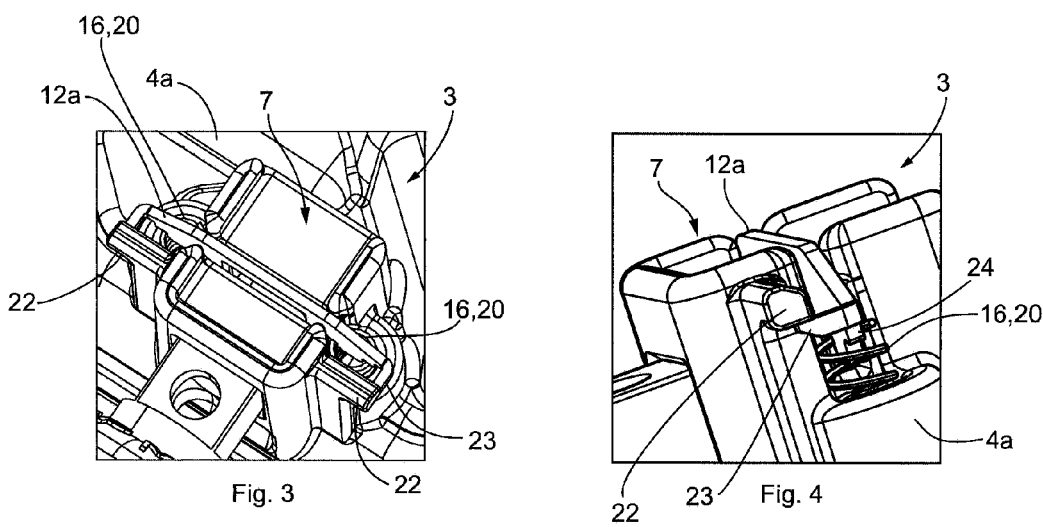
FIG. 3 shows an enlarged view of a mounting region of a tire air pressure sensor of the tire monitoring system from FIG. 1.
FIG. 4 shows another enlarged view of the mounting region of the tire air pressure sensor of the tire monitoring system from FIG. 1.

With the tire monitoring system 1a according to the first embodiment, shown in FIGS. 1 to 4, the mounting region 7 comprises a fastening element 12a, which is depicted in detail in FIG. 2. The fastening element 12a is retained in a slot-shaped recess 14 of the mounting region 7, and can be moved between a locking position and an unlocking position in the slot-shaped recess 14. The slot-shaped recess 14 extends such that it is transverse to the longitudinal axis 15 of the valve stem 2 when the valve stem 2 is installed (see FIG. 1 for example). The fastening element 12a has an annular shape, and has a passage 17, through which at least the attachment section 9 of the valve stem 2 can be inserted. As a result, the fastening element 12a encompasses the attachment section 9 of the valve stem 2 when valve stem 2 is installed. In the locking position of the fastening element 12a, the attachment section 9 of the valve stem 2 is releasably attached to the mounting region 7 of the housing 4a using the fastening element 12a, while in the unlocking position, the mounting region 7 and the attachment section 9 can be released from one another. In other words, the mounting region 7 of the housing 4a movably supports the fastening element 12a between the locking position and the unlocking position. In the locking position, a latching section 18 of the annular fastening element 12a is engaged, at least in sections, with the attachment section 9 of the valve stem 2, wherein the latching section 18 is a ring segment of the fastening element 12a, which engages in a latching recess 26 of the attachment section 9 when in the locking position. The latching recess 26 in the attachment section 9 of the valve stem 2 is designed to be encompassing, wherein this is not absolutely necessary. The important thing is that the annular fastening element 12a can be engaged through its latching section 18 with the latching recess 26 in such manner that a movement of the valve stem 2 out of the insertion receiver 8 is blocked. An elastic latching element 16 presses the fastening element 12a into the locking position shown in FIGS. 3 and 4. The elastic latching element 16 allows a movement of the fastening element 12a in relation to the housing 4, wherein this relative movement is directed toward the undersurface 19 of the housing 4a, and brings the fastening element 12a into the unlocking position. This relative movement, or movement toward the unlocking position, occurs thereby counter to the pressure exerted by the elastic latching element 16. In the first embodiment, the elastic latching element 16 is designed as a spring element 20 having two coil springs. The coil springs of the spring element 20 are inserted in respective holes 21 in the housing 4a, and are supported on the base of the respective hole 21 such that the elastic latching element 16, or the spring element 20, respectively, exerts pressure on the fastening element 12a, in a direction pointing away from the undersurface 19 of the housing 4a. The holes 21 are formed at the sides of the mounting region 7. When the fastening element 12a is disposed in the slot-shaped recess 14, the coil springs of the spring element 20 act on respective actuation attachments 24, formed on the fastening element 12a, protruding laterally and outward. In order for the fastening element 12a to arrive in the unlocking position from the locking position shown in FIGS. 1, 3 and 4, which is a home position of the fastening element 12a retained in the slot-shaped recess 14, the fastening element 12a must be pushed down against the force of the spring element 20, wherein the actuation attachments 24 push against the coil springs of the spring element 20 thereby. When there is no longer any pressure acting from above on the actuation element 12a, the pressure of the spring element 20 presses against the actuation attachments 23 and forces the fastening element 12a back into the locking position.

The tire monitoring system 1b of the second embodiment, shown in FIGS. 5 to 7, corresponds to a large extent with the first embodiment, such that the description for the first embodiment also applies to corresponding components and technical aspects of the second embodiment. The tire monitoring system 1b likewise has a fastening element 12b, which is movably retained in the slot-shaped recess 14 of the mounting region 7 of the housing 4b, between the locking position and the unlocking position. The fastening element 12b of the tire monitoring system 1b of the second embodiment also has an annular design, and has a latching section 18, which is designed as a ring segment of the annular body of the fastening element 12b, and which engages in the latching recess 26 of the attachment section 9 when the fastening element 12b is in the locking position, in order to secure the valve stem 2 in the insertion receiver 8. Likewise, with the second embodiment the elastic latching element 16 pushes the fastening element 12b into the locking position shown in FIG. 6, and allows a movement of the fastening element 12b in relation to the housing 4, wherein the relative movement is directed toward the undersurface 19 of the housing 4a, and brings the fastening element 12a into the unlocking position. The latching element 16 pushes, in particular, the fastening element 12b into the locking position and the latching section 18 of the fastening element 12b into the latching recess 26 of the valve stem 2. In order to disengage the fastening element 12b from the valve stem 2, the fastening element 12b must be pushed downward, out of the locking position, into the unlocking position, wherein this movement relative to the housing 4b occurs counter to the pressure exerted by the elastic latching element 16. In the second embodiment, the elastic latching element 16 is designed as a spring arm 27, formed as an integral part of the housing 4b. On the whole, two spring arms 27 are formed on the housing 4b, wherein the spring arms 27 are disposed on both sides of the mounting region 7, adjacent to the slot-shaped recess 14. A first longitudinal end 28 of a respective spring arm 27 is connected to the housing 4b thereby, as an integral part thereof, while the other, second longitudinal end 29 of a respective bowed spring arm 27 pushes against a respective actuation attachment 24 of the fastening element 12b. The spring arms 27 push against the actuation attachments 24 of the fastening element 12b thereby, such that the spring arms 27 exert a pressure in a direction pointing away from the undersurface 19 of the housing 4b, and force the fastening element 12b into the locking position. A removal of the valve stem 2 then occurs in that the fastening element 12b is pushed downward, counter to the pressure exerted by the spring arms 27, by means of which the latching section 18 of the fastening element 12b becomes disengaged from the latching recess 26 of the valve stem 2, such that the valve stem 2 can be pulled out of the insertion receiver 8. A further development of the second embodiment is depicted in FIG. 7. With this further development, a protective wall element 25 extends parallel to the latching element 16. More precisely, it extends parallel to a spring arm 27 of a protective wall element 25 in each case. The protective wall element 25 is formed on the housing 4b, and extends over the spring arms 20 in a direction pointing away from the housing 4b. The protective wall elements 25 on both sides of the mounting region 7 prevent an undesired actuation of, or damage to, the spring arms 20, for example during the installation and removal of the tire monitoring system 1b on a vehicle tire.

The third embodiment of the tire monitoring system 1c, shown in FIGS. 8 and 9, also corresponds to the first embodiment to a large extent, such that the description of the first embodiment also applies here for corresponding components and technical aspects of the third embodiment. The tire monitoring system 1c comprises a fastening element 12c, which in turn is movably retained in the slot-shaped recess 14 of the mounting region 7 of the housing 4c between the locking position and the unlocking position. The fastening element 12c of the tire monitoring system 1c of the third embodiment also has a substantially annular design. The fastening element 12c has the latching section 18 in the form of a ring segment, which engages in the latching recess 26 of the attachment section 9 when the fastening element 12c is in the locking position, by means of which the valve stem 2 is secured in the insertion receiver 8. As with the other two embodiments, the elastic latching element 16 in the third embodiment also presses the fastening element 12c into the locking position shown in FIG. 8. In order to move the fastening element 12c into the unlocking position, and to disengage the latching section 18 from latching recess 26, the fastening element 12c must be pushed down in the slot-shaped recess 14 toward the undersurface 19 of the housing 4c, for which it must be moved counter to the pressure exerted by the latching element. In the third embodiment the elastic latching element 16 comprises two spring arms 30, formed as an integral part of the fastening element 12c. The two spring arms 30 are formed on opposite sides of the fastening element 12c, and are elastically deformable, wherein they bear against the housing 4c in the locking position of the fastening element 12c shown in FIG. 8. The elastic latching element 16, or the two spring arms 30, respectively, exert a pressure on the fastening element 12c in a direction pointing away from the undersurface 19 of the housing 4c, by means of which the latching section 18 of the fastening element 12c becomes engaged with, or is forced into engagement with, the latching recess 26 of the valve stem 2. In order to remove the valve stem 2, the fastening element 12b is pushed down, toward the undersurface 19 of the housing 4c, counter to the pressure exerted by the spring arms 30, by means of which the latching section 18 of the fastening element 12c becomes disengaged from the latching recess 26 of the valve stem 2. The valve stem 2 can then be removed from the insertion receiver 8. It is to be understood that the mounting of the valve stem 2 on the tire air pressure sensor 3 occurs in the reverse sequence.

Lastly, the fourth embodiment of a tire monitoring system 1d, shown in FIGS. 10 to 14 and referenced below, also corresponds to a large extent to the second embodiment, such that the description of the second embodiment also applies to the fourth embodiment, as long as there is no indication to the contrary, in the following. The housing 4d of the tire pressure sensor 3 has an insertion receiver 8, in which the valve stem 2, with its attachment section 2, is inserted for the mounting thereof. For a precise orientation of the opening 10 in the valve stem 2, the stem is inserted into the insertion receiver 8 with the flat area 11 oriented appropriately, wherein a step 40 is formed in the mounting region 7, corresponding to the flat area, such that the attachment section 9 of the valve stem 2 can only be inserted into the insertion receiver 8 in one single specific orientation. FIGS. 11 and 12 show the locking position of the fastening element 12d thereby, wherein only the fastening element 12d and the valve stem 2 are shown in FIG. 11, while FIG. 12, in contrast, shows the fastening element 12d accommodated in the mounting region 7. It is clear in FIG. 12 that the latching section 18 of the fastening element 12d is disposed in the movement path of the valve stem 2. Furthermore, FIG. 12 also shows, however, that the cross-section of the insertion receiver 8 is adapted to the outer contour of the fastening element 12d, and exhibits a T-shaped design, which, in addition to the step 40, determines the orientation of the valve stem 2 in relation to the tire air pressure sensor 3. In order to then be able to insert the attachment section 9 of the valve stem 2 into the insertion receiver 8, the latching section 18 must be removed from the movement path of the valve stem 2. For this, the fastening element 12d is displaceably retained in the slot-shaped recess 14 of the chimney-shaped mounting region. In the embodiments described above, a technician was necessary for this, who manually forces the fastening element 12d downward, toward the undersurface 19 of the tire air pressure sensor 3. According to the fourth embodiment, the attachment section 9 of the valve stem 2 now has a ramp-shaped bevel 41. The ramp-shaped bevel 41 is formed on a section of the peripheral surface of the valve stem 2, and during the installation of the valve stem 2 forces the movably supported fastening element 12d into the unlocking position, over the latching section 18 thereof, thus toward the undersurface 19 of the housing 4d. As a result, it is no longer necessary during assembly for the technician to force the latching section 18 of the fastening element 12d out of the movement path of the valve stem 2. This is done, in the fourth embodiment, by the ramp-shaped bevel (41), wherein the attachment section 9 in the other three embodiments could also have a ramp-shaped bevel 41. The attachment section 9 of the valve stem 2 has the latching recess 26 that is formed behind the ramp-shaped bevel 41, viewed from the front surface of the attachment section 9 in the longitudinal direction of the valve stem 2. In the locking position, shown in FIG. 11, the latching section 18 of the fastening element 12d engages in the latching recess 26 from the direction of the undersurface 19 of the housing 4d.

As can furthermore be derived from FIGS. 10, 11 and 13, in the fourth embodiment the attachment section 9 of the valve stem 2 has two blocking lugs 42, which protrude from the attachment section 9. For the following function, a single blocking lug 42 would be sufficient, wherein, however, more than two blocking lugs 42 could also be formed. The important thing, however, is that the passage 17 has an unlocking section 43 adapted to the blocking lugs 42. The unlocking section 43 is disposed and formed on the side of the fastening element 12d lying opposite the latching section

18. As a result of the fastening element 12*d* being movably retained in the mounting region 7, the unlocking section 43 is disposed outside of the movement path of the valve stem 2 when in the locking position. When the fastening element 12*d* is disposed in the locking position, the blocking lugs 42 rest on the fastening element 12*d*, as shown in FIG. 11, such that a movement of the valve stem 2 directed away from the tire air pressure sensor 3 (a movement directed into the drawing plane with respect to FIG. 11) is blocked. The locking position of the fastening element 12*d* is likewise shown in FIG. 12, but in this case, not in relation to the valve stem (as in FIG. 11), but rather, in relation to the mounting region 7 with its insertion receiver 8, having a T-shaped design in this embodiment. As can be seen in FIG. 12, both the latching section 18 as well as the blocking section 44 of the fastening element 12*d* are located in the movement path of the valve stem 2, such that it is doubly, or twice, secured in the locking position on the tire air pressure sensor 3. In order to move the fastening element 12*d* out of the locking position into the unlocking position, the fastening element 12*d* must be moved toward the undersurface 19 of the housing 4*d* in the mounting region 7. For this, the fastening element 12*d* has an actuation attachment 45 formed at the top, that the technician can press in order to force the fastening element 12*d* into the unlocking position. Although the actuation attachment 45 is only shown for the fourth embodiment and the second variation of the second embodiment according to FIG. 7, it is to be understood, however, that an actuation attachment 45 of this sort can also be provided in the first and third embodiments, in order to facilitate the actuation of the fastening element 12*a*; 12*c*. If the technician's finger should slip during the installation or removal, i.e. during actuation of the actuation attachment 45, the spring arms 27 formed at the sides of the chimney-shaped mounting region 7 on the housing 4*d* are protected from damage by respective protective wall elements 25, which are also disposed and formed on the housing 4*d*, and were already described in reference to the second embodiment for FIG. 7. When the fastening element 12*d* is then disposed in the unlocking position, depicted in FIGS. 13 and 14, the unlocking section 43 of the fastening element 12*d* is then located in the movement path of the valve stem 2. As is shown in particular in FIG. 14, the unlocking section 43 and the latching section 18 are disposed, when in the locking position, such that the passage 17 is flush with the cross-section of the insertion receiver 8. In other words, the unlocking section 43 and the latching section 18 are no longer in the movement path of the T-shaped attachment section 9 of the valve stem 2, such that the attachment section 9 can be pulled out of the T-shaped insertion receiver 8 and the passage 17 of the fastening element 12*d* without difficulty, for the removal of the valve stem 2.

A tire monitoring system 1*e* according to a fifth embodiment, shown in FIGS. 15 to 18, and to which reference shall be made below, corresponds to a large extent to the fourth embodiment, such that the description of the fourth embodiment also applies to the fifth embodiment, as long as there is no indication to the contrary, in the following. The valve stem 2 is again inserted with its attachment section 2 into the housing 4*e* of the tire pressure sensor 3, wherein the fastening element 12*e* ensures that the valve stem 2 is attached to the housing 4*e*. FIG. 17 shows the locking position of the fastening element 12*e*, while FIG. 18, on the contrary, shows the unlocking position of the fastening element 12*e*. The attachment section 9 of the valve stem 2 again has two blocking lugs 42, protruding from the attachment section 9. The fastening element 12*e* furthermore has the unlocking section 43 adapted to the blocking lugs 42, which is formed on the side of the fastening element 12*e* lying opposite the latching section 18. In differing from the fourth embodiment, a hook-shaped retaining attachment 50, formed at the top, having a bearing section 51, is formed on the fastening element 12*e* in the fifth embodiment. The retaining attachment 50 comprises, aside from the bearing section 51, the actuation attachment 45 that the technician can press in order to force the fastening element 12*e* into the unlocking position. The retaining attachment 50 has an overall L-shaped design, wherein the bearing section 51 runs parallel to the slot-shaped recess 14 in the dome-shaped, or chimney shaped mounting region 7, and bears on the mounting region 7, or is supported by a wall of the mounting region 7, respectively. Not only the latching element 16, or spring arms 27, respectively, are protected by a protective wall element 25, but also the bearing section 51 and the actuation attachment 45 of the retaining element are covered by protective wall elements 25 in sections, in order to prevent an unintentional actuation thereof, or damage thereto. When the actuation attachment 45 is actuated, in that it is pressed toward the undersurface 19 of the housing 4*e*, and moves the fastening element 12*e* out of the locking position into the unlocking position, the bearing section 51 slides along the wall of the mounting region 7, and is supported by this region. Although the retaining attachment 50, having the actuation attachment 45 and the bearing section 51, is only shown for the fifth embodiment, it is to be understood, however, that a retaining attachment 50 of this sort, having at least bearing section 51, can also be provided in the other embodiments, in order to increase the stability of the valve stem attachment.

With all five embodiments of the tire monitoring system 1*a*, 1*b*, 1*c*, 1*d*, 1*e*, according to the invention, the mounting region 7 of the housing 4*a*, 4*b*, 4*c*, 4*d*, 4*e* has securing arms 22 disposed at the sides of the slot-shaped recess 14. These securing arms 22, designed as snap-on catches, serve to secure the fastening element 12*a*, 12*b*, 12*c*, 12*d*, 12*e* on the mounting region 7 of the housing 4*a*, 4*b*, 4*c*, 4*d*, 4*e*, in that the securing arm 22 blocks a movement of the fastening element 12*a*, 12*b*, 12*c*, 12*d*, 12*e* from the unlocking position over and beyond the locking position, or from the undersurface 19 of the housing 4*a*, 4*b*, 4*c*, 4*d*, 4*e* over and beyond the locking position, respectively. The securing arms 22 each act together with a blocking arm 23 thereby. The blocking arms 23, which extend in the direction of the longitudinal axis 15 of the valve stem 2 when it is installed, are formed on the fastening element 12*a*, 12*b*, 12*c*, 12*d*, 12*e*. When the fastening element 12*a*, 12*b*, 12*c*, 12*d*, 12*e* is in the locking position, the blocking arms 23 rest against the securing arms 20 of the housing 4*a*, 4*b*, 4*c*, 4*d*, 4*e*, such that the fastening element 12*a*, 12*b*, 12*c*, 12*d*, 12*e* is prevented from moving out of the slot-shaped recess 14. The securing arms 22 thus form a type of stop surface for the blocking arms 23, and limit the movement of the fastening element 12*a*, 12*b*, 12*c*, 12*d*, 12*e* in a movement direction directed away from the undersurface 19 of the housing 4*a*, 4*b*, 4*c*, 4*d*, 4*e*. The fastening element 12*a*, 12*b*, 12*c*, 12*d*, 12*e* is secured in this manner on the tire air pressure sensor 3, or the housing thereof 4*a*, 4*b*, 4*c*, 4*d*, 4*e*, respectively, such that it cannot be lost, and cannot move out of the slot-shaped recess 14.

In summary, a tire monitoring system 1*a*, 1*b*, 1*c*, 1*d*, 1*e* is described above for five different embodiments. All five embodiments have in common that the valve stem 2 is releasably attached to the attachment section 7 of the tire air pressure sensor 3 using a fastening element 12*a*, 12*b*, 12*c*, 12d, 12e. The fastening element 12a, 12b, 12c, 12d, 12e is held in the locking position by the latching element 16 thereby, in that the snap-element 16 exerts a pressure in a direction pointing away from the undersurface 19 of the housing 4a, 4b, 4c, 4d, 4e, by means of which the latching section 18 of the fastening element 12a, 12b, 12c, 12d, 12e is forced into the latching recess 26 of the valve stem and engages therewith. In other words, the elastic latching element 16 exerts a tensioning force on the fastening element 12a, 12b, 12c, 12d, 12e, forcing the fastening element 12a, 12b, 12c, 12d, 12e into the locking position. The latching element 16 can be designed thereby as a separate component 12a (see first embodiment in accordance with FIGS. 1 to 4), as a component 12b, 12d, 12e that is designed as an integral part of the housing 4b of the tire air pressure sensor 3 (see second, fourth and fifth embodiments, in accordance with FIGS. 5 to 7, 10 to 14, and 15 to 18), or as a component 12c designed as an integral part of the fastening element 12c (see third embodiment in accordance with FIGS. 8 and 9).

The invention described above is, as a matter of course, not limited to the described and depicted embodiments. It is clear that numerous modifications, obvious to the person skilled in the art regarding the intended use, can be made to the embodiments depicted in the drawings without abandoning the field of the invention as a result. Everything contained in the description and/or depicted in the drawings, including that deviating from the concrete exemplary embodiments that is obvious to the person skilled in the art, belongs to the invention.

The invention claimed is:

1. A tire monitoring system for a vehicle for establishing a tire-specific parameter comprising:
a valve stem,
at least one fastening element, and
a tire air pressure sensor including a housing which accommodates a sensor for establishing at least one tire-specific parameter and for a wireless transmission of the at least one tire-specific parameter,
wherein the housing has a mounting region, and the valve stem comprises an attachment section, and
wherein, when the at least one fastening element is in a locking position, the attachment section of the valve stem and the mounting region of the housing are releasably connected to one another using the fastening element,
wherein the mounting region of the housing movably supports the at least one fastening element between a locking position and an unlocking position, in which the mounting region and the attachment section are adapted to be released from one another, and
at least one elastic latching element is provided, which allows a movement of the at least one fastening element in relation to the housing toward the unlocking position, counter to a pressure exerted by the at least one elastic latching element, and which presses the at least one fastening element into the locking position.

2. The tire monitoring system according to claim 1, wherein a slot-shaped recess is formed in the mounting region having a chimney-shaped design, which extends transverse to the longitudinal axis of the valve stem when it is installed, and in which the at least one fastening element is held between the locking position and the unlocking position in a displaceable manner.

3. The tire monitoring system according to claim 1, wherein the at least one fastening element has an annular or circle segment design, and has a passage, through which the attachment section is adapted to be inserted when the valve stem is mounted on a tire air pressure sensor, wherein, when the valve stem is installed, the at least one fastening element encompasses, at least in sections, the attachment section of the valve stem, and a latching section of the substantially annular, or circle-segment shaped fastening element is engaged, at least in sections, when in the locking position, with the attachment section of the valve stem.

4. The tire monitoring system according to claim 3, wherein the attachment section of the valve stem has a ramp-shaped bevel, formed on a section of the peripheral surface of the valve stem, wherein the ramp-shaped bevel forces the movably supported fastening element over the latching section into the unlocking position, when the valve stem is installed.

5. The tire monitoring system according to claim 4, wherein the attachment section of the valve stem has a latching recess, that is formed on the attachment section, behind the ramp-shaped bevel when viewed from the front surface of the attachment section in the longitudinal direction of the valve stem, and engages in the latching section of the fastening element when in the locking position.

6. The tire monitoring system according to claim 3, wherein at least one blocking lug protrudes from the attachment section of the valve stem, wherein the passage has an unlocking section adapted to the at least one blocking lug, which is disposed outside of the movement path of the valve stem when in the locking position, such that the at least one blocking lug bears against the fastening element and a movement of the valve stem away from the tire air pressure sensor is blocked, and which, when in the unlocking position, is disposed in the movement path of the valve stem such that the valve stem can is adapted to be pulled out of the passage for the removal thereof.

7. The tire monitoring system according to claim 1, wherein the at least one elastic latching element is designed as a spring element, which is inserted in a recess formed in the housing, and is supported on the base of the recess such that the at least one elastic latching element exerts a pressure on the fastening element in a direction pointing away from the undersurface of the housing.

8. The tire monitoring system according to claim 1, wherein the at least one elastic latching element is designed as a spring arm that is an integral part of the fastening element, wherein the spring arm bears against the housing such that the at least one elastic latching element exerts a pressure on the fastening element in a direction pointing away from the undersurface of the housing.

9. The tire monitoring system according to claim 1, wherein the at least one elastic latching element is designed as a spring arm that is an integral part of the housing, wherein the spring arm is connected at its first longitudinal end to the housing, and its second longitudinal end bears against the at least one fastening element such that the at least one elastic latching element exerts a pressure on the at least one fastening element in a direction pointing away from the undersurface of the housing.

10. The tire monitoring system according to claim 9, wherein at least one protective wall element extends parallel to the at least one elastic latching element, which wall element is formed on the housing and extends over the at least one elastic latching element in a direction pointing away from the housing.

11. The tire monitoring system according to claim 1, wherein the mounting region of the housing has at least one securing arm, which secures the at least one fastening element on the mounting region of the housing, in that the at least one securing arm blocks a movement of the at least one fastening element directed from the unlocking position over and beyond the locking position.

12. The tire monitoring system according to claim 11, wherein the at least one fastening element has a blocking arm, which bears against the securing arm of the housing when the at least one fastening element is in the locking position.

13. The tire monitoring system according to claim 1, wherein the attachment section of the valve stem has, at least in sections, a flat area, and the mounting region of the housing has an insertion receiver designed to be complementary to the flat area, such that, in order to install the valve stem on the tire air pressure sensor, the attachment section of the valve stem is adapted to be inserted in the insertion receiver such that it cannot rotate.

14. The tire monitoring system according to claim 1, wherein the elastic latching element exerts a tensioning force on the fastening element that forces the fastening element into the locking position.

15. The tire monitoring system according to claim 1, wherein the fastening element has a hook-shaped retaining attachment formed at the top thereof, having at least one support section, which bears against the mounting region.

16. The tire monitoring system of claim 1 wherein the tire air pressure sensor communicates with a vehicle-side control device.

* * * * *